United States Patent
Yang

(10) Patent No.: US 6,929,296 B2
(45) Date of Patent: Aug. 16, 2005

(54) MOTOR VEHICLE BUMPER SYSTEM

(76) Inventor: Chin-Hun Yang, No. 111, Ta Nan Road, Shih Lin District, Taipei City (TW)

(*) Notice: Subject to any disclaimer, the term of this patent is extended or adjusted under 35 U.S.C. 154(b) by 0 days.

(21) Appl. No.: 10/642,229

(22) Filed: Aug. 18, 2003

(65) Prior Publication Data

US 2004/0032132 A1 Feb. 19, 2004

Related U.S. Application Data

(63) Continuation-in-part of application No. 10/122,004, filed on Apr. 11, 2002, now abandoned.

(51) Int. Cl.$^7$ .............................................. B60R 19/38
(52) U.S. Cl. ......................................... 293/118; 293/5
(58) Field of Search ........................... 293/5, 102, 107, 293/118, 119

(56) References Cited

U.S. PATENT DOCUMENTS

| | | | | |
|---|---|---|---|---|
| 3,346,292 A | * | 10/1967 | Ervin | 293/118 |
| 3,355,208 A | * | 11/1967 | Brock | 293/118 |
| 3,677,595 A | * | 7/1972 | Hamilton | 293/118 |
| 3,834,483 A | * | 9/1974 | Palmer | 293/118 |
| 3,947,061 A | * | 3/1976 | Ellis | 293/118 |
| 5,951,073 A | * | 9/1999 | Hall | 293/119 |
| 5,967,573 A | * | 10/1999 | Wang | 293/118 |
| 6,193,460 B1 | * | 2/2001 | Damico | 293/118 |
| 6,227,583 B1 | * | 5/2001 | Eipper et al. | 293/107 |
| 6,264,258 B1 | * | 7/2001 | Li et al. | 293/118 |
| 6,435,578 B1 | * | 8/2002 | Li | 293/107 |

* cited by examiner

*Primary Examiner*—Lori L. Coletta
(74) *Attorney, Agent, or Firm*—Pro-Techtor Inter-national Services

(57) ABSTRACT

A motor vehicle bumper system includes a bumper unit having pairs of hydraulic cylinders controlled to move a bumper between an extended position and a retracted position, a pump controlled to pump the oil from an oil tank to the hydraulic cylinders to move the bumper between the extended position and the retracted position, a pressure-setup pipe unit connected between the hydraulic cylinders, the pump and the oil tank and equipped with a decompression valve and controlled by a direction control valve to let the oil be alternatively pumped to the upper oil chambers and lower oil chambers of the hydraulic cylinders to retract or extend out the bumper, and a pressure-relief pipe unit using a relief valve and an accumulator to release pressure from the hydraulic cylinders and a hydraulic oil pressure sensor to control the explosion time of the air bag of the motor vehicle.

7 Claims, 15 Drawing Sheets

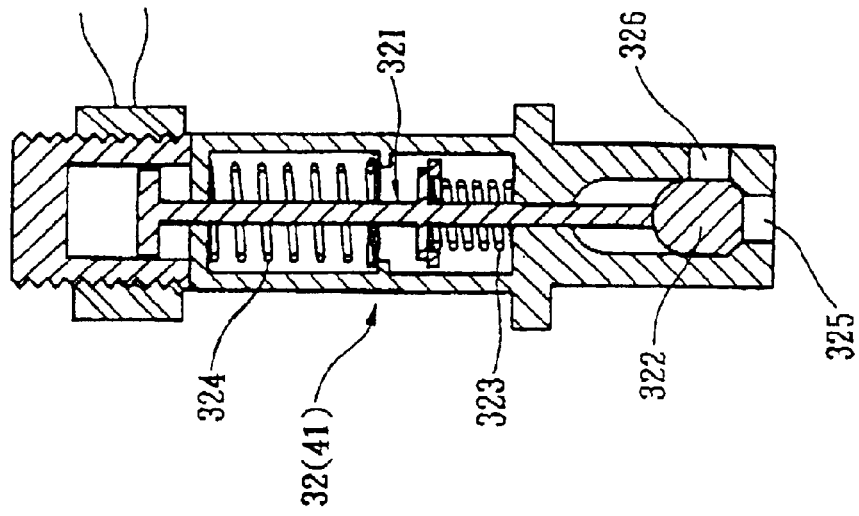
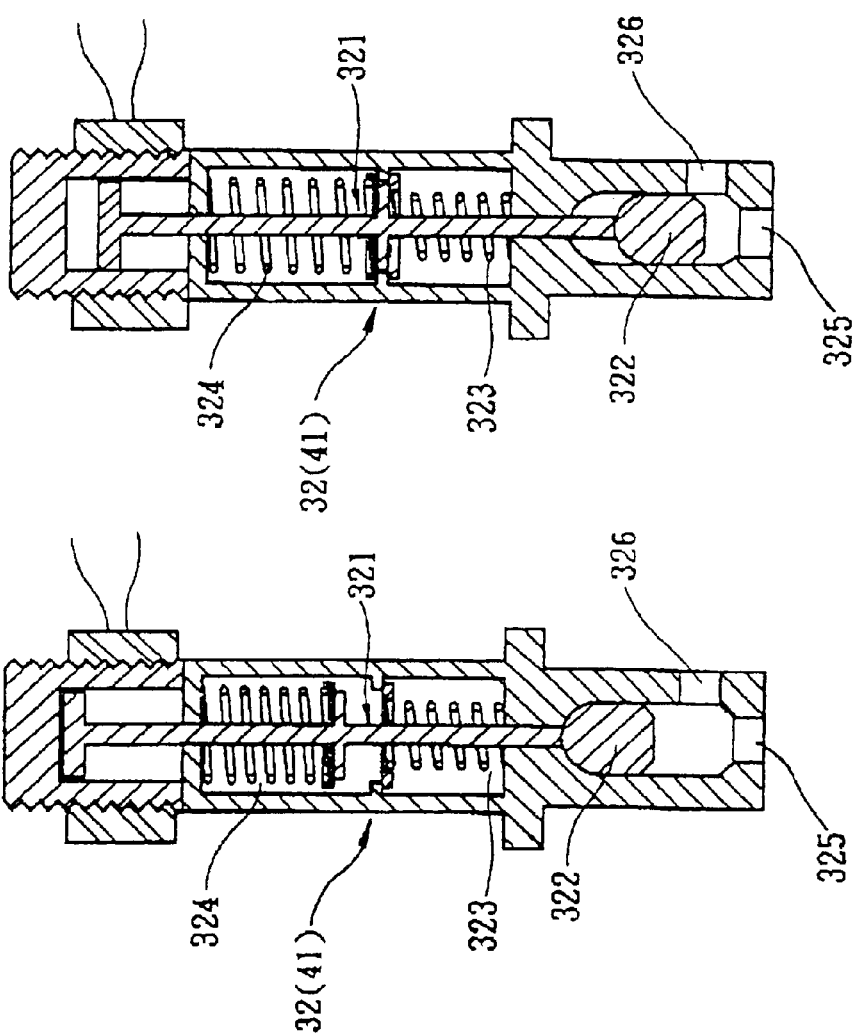

MOTOR VEHICLE BUMPER SYSTEM

CROSS-REFERENCE TO RELATED APPLICATION

This application is a continuation-in-part of the patent application Ser. No. 10/122,004, filed Apr. 11, 2002 now abandoned.

BACKGROUND OF THE INVENTION (a) Technical Field of the Invention

The present invention relates to a motor vehicle bumper system and, more particularly, to an anti-locking motor vehicle bumper system, which has a multi-direction oil loop that effectively absorbs shocks upon receiving a bump.

(b) Description of the Prior Art

A variety of bumper systems and airbag systems have been disclosed for motor vehicles to protect the driver against impact from an outside source. Conventional motor vehicle bumpers are fixed in place. These fixed motor vehicle bumpers are less effective in absorbing shocks upon receiving a bump. There are also known movable motor vehicle bumper designs that enable the front or rear bumper to move upon impact, so as to effectively lessen the shock of sudden impact. According to conventional bumper systems, the bumper extends out only when the driver steps on the brake pedal. In the case where the driver does not step on the brake upon receiving a bump, the bumper reciprocating cylinders do not work. The oil loop design of conventional bumper systems is complicated, and consumes much electricity during operation. Further, the shock absorbing effect of conventional motor vehicle bumper systems differs with the installation location of the accumulator.

Furthermore, a car may be equipped with an air bag in front of the driver's seat. The internal air pressure is quickly increased to explore the air bag upon receiving a bump. Because the explosion time is subject to the variation of the air pressure, the reaction speed is slow, and the high temperature produced during explosion may burn the user, and the explosion of the air bag may injure the car driver's neck.

SUMMARY OF THE INVENTION

The present invention has been accomplished to provide a motor vehicle bumper system, which eliminates the aforesaid drawbacks. It is the main object of the present invention to provide a motor vehicle bumper system, which eliminates the phenomena of dead cylinders (locking of hydraulic cylinders) after receiving a bump. It is another object of the present invention to provide a motor vehicle bumper system, which effectively absorbs shocks upon receiving a bump. It is still another object of the present invention to provide a motor vehicle bumper system, which reduces the consumption of electricity. To achieve these and other objects of the present invention, a motor vehicle bumper system is provided and installed in a motor vehicle, using the flow rate of oil circulating through an oil tank to control pressure and an accumulator with a hydraulic oil pressure sensor to absorb energy upon impact. The motor vehicle bumper system comprises a bumper unit, the bumper unit comprising a bumper, and parallel hydraulic cylinders controlled to move the bumper between an extended position and a retracted position; a control switch means; a pump controlled by the control switch means to pump the oil from the oil tank to the hydraulic cylinders, causing the hydraulic cylinders to move the bumper between the extended position and the retracted position; a pressure-setup pipe unit connected between the hydraulic cylinders, the pump and the oil tank of the motor vehicle, the pressure-set up pipe unit comprising an upper oil chamber connecting pipe connected between the upper oil chambers of the hydraulic cylinders for guiding the oil into the hydraulic cylinders to retract the bumper, a lower oil chamber connecting pipe connected between the lower oil chambers of the hydraulic cylinders for guiding the oil into the hydraulic cylinders to extend out the bumper, a direction control valve adapted to control the connection of the upper oil chamber connecting pipe and the lower oil chamber connecting pipe to the pump and the oil tank of the motor vehicle, a branch pipe extended from the lower oil chamber connecting pipe to the oil tank a decompression valve installed in the branch pipe; and a pressure-relief pipe unit, the pressure-relief pipe unit comprising an accumulator, a pipe connected between the lower oil chamber connecting pipe and the accumulator, and a relief valve installed in the pipe between the lower oil chamber connecting pipe and the accumulator. When the control switch means is switched on, the decompression valve and the relief valve are closed, the direction control valve is in action, and the pump is started to pump the oil to the hydraulic cylinders to extend the bumper outward, and then the decompression valve and the relief valve are opened after the bumper has been extended out. When the control switch means is switched off, the decompression valve and the relief valve are closed; the direction control valve is reversed, enabling the hydraulic cylinders to retract the bumper.

Further, the pressure relief pipe unit of the motor vehicle bumper system comprises a hydraulic oil pressure sensor coupled to the air bag of the motor vehicle and adapted to control the explosion time of the air bag subject to the change of the hydraulic oil pressure, so as to accurately and quickly explode the air bag, preventing a secondary injury to the driver and improving the safety index upon an impact of the motor vehicle.

BRIEF DESCRIPTION OF THE DRAWINGS

FIGS. 8A–8C are schematic drawings showing the actions of the decompression valve and the relief valve according to the present invention.

DETAILED DESCRIPTION OF THE PREFERRED EMBODIMENT

Figure 1:
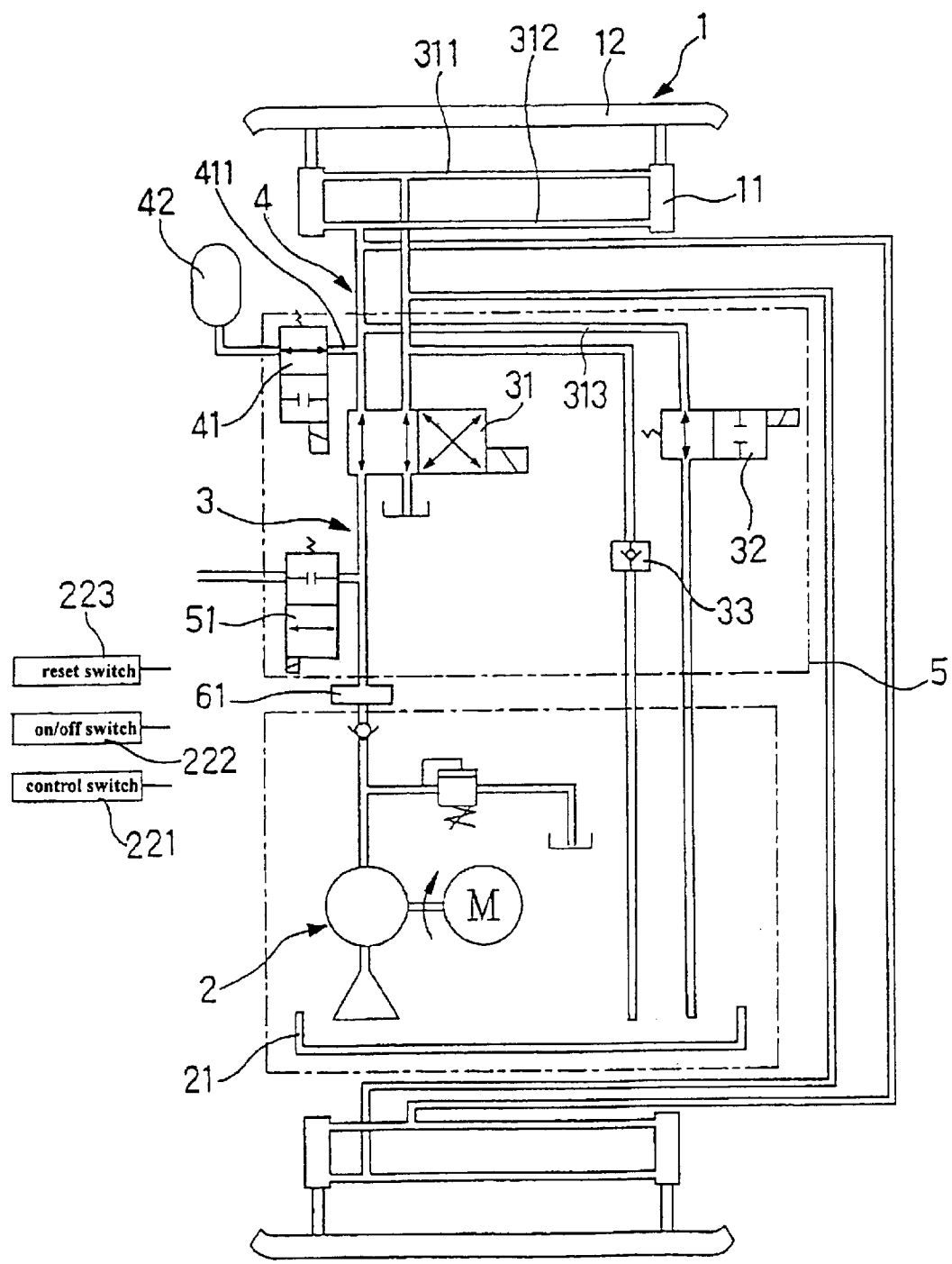
FIG. 1 is a plain view showing the arrangement of the motor vehicle bumper system according to the present invention.

Referring to FIG. 1, a motor vehicle bumper system in accordance with the present invention is shown comprised of a bumper unit 1, a pump 2, a pressure-setup pipe unit 3, and a pressure-relief pipe unit 4.

The bumper unit 1 comprises two parallel hydraulic cylinders 11, and a bumper 12 coupled to the hydraulic cylinders 11 at the front side. (Two bumper units may be provided, and respectively installed in the front and rear side of the motor vehicle).

The pump 2 is connected between the hydraulic cylinders 11 and an oil tank 21, and controlled by an on/off switch 222 to provide a pressure source for extending and retrieving the bumper unit 1. The control switch 221 can be operated synchronously with the ignition switch of the motor vehicle. Further, a reset switch 223 is installed in the motor vehicle, and adapted to start the pump 2 to extend out the bumper unit 1 each time the bumper 12 is bumped.

Figure 7A:
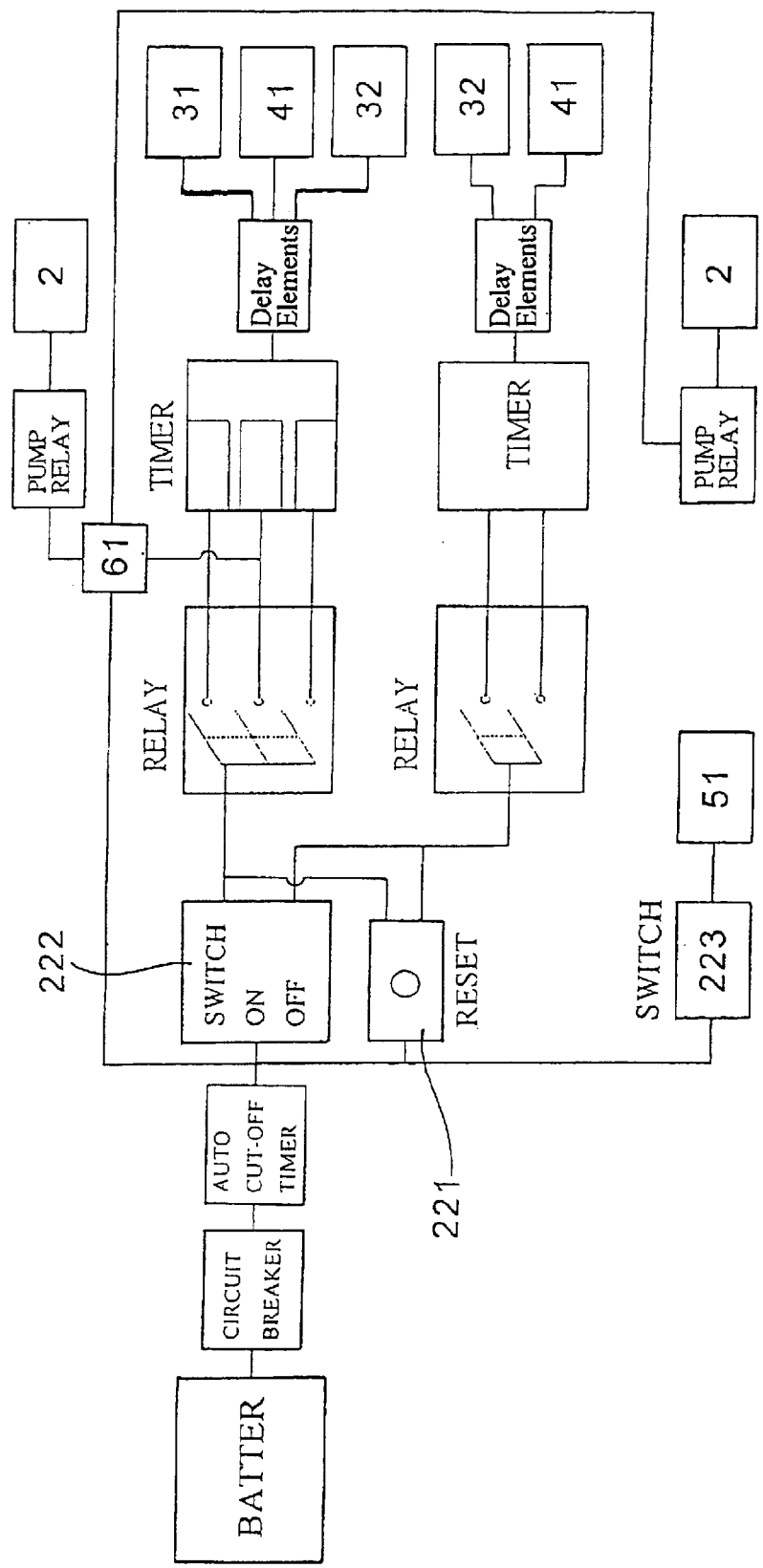
FIGS. 7A and 7B illustrate the control circuit of the motor vehicle bumper system according to the present invention.

Normally, when the hydraulic cylinder of the present invention is linked to the power steering system of the motor vehicle, the power steering system provides the desired pressure source. When the engine of the motor vehicle is abnormal, or fails, the pressure drops below the set value, and a pressure switch 61 is induced to switch on the pump 2, causing it to provide an emergency pressure source (see FIG. 7A).

Figure 7B:
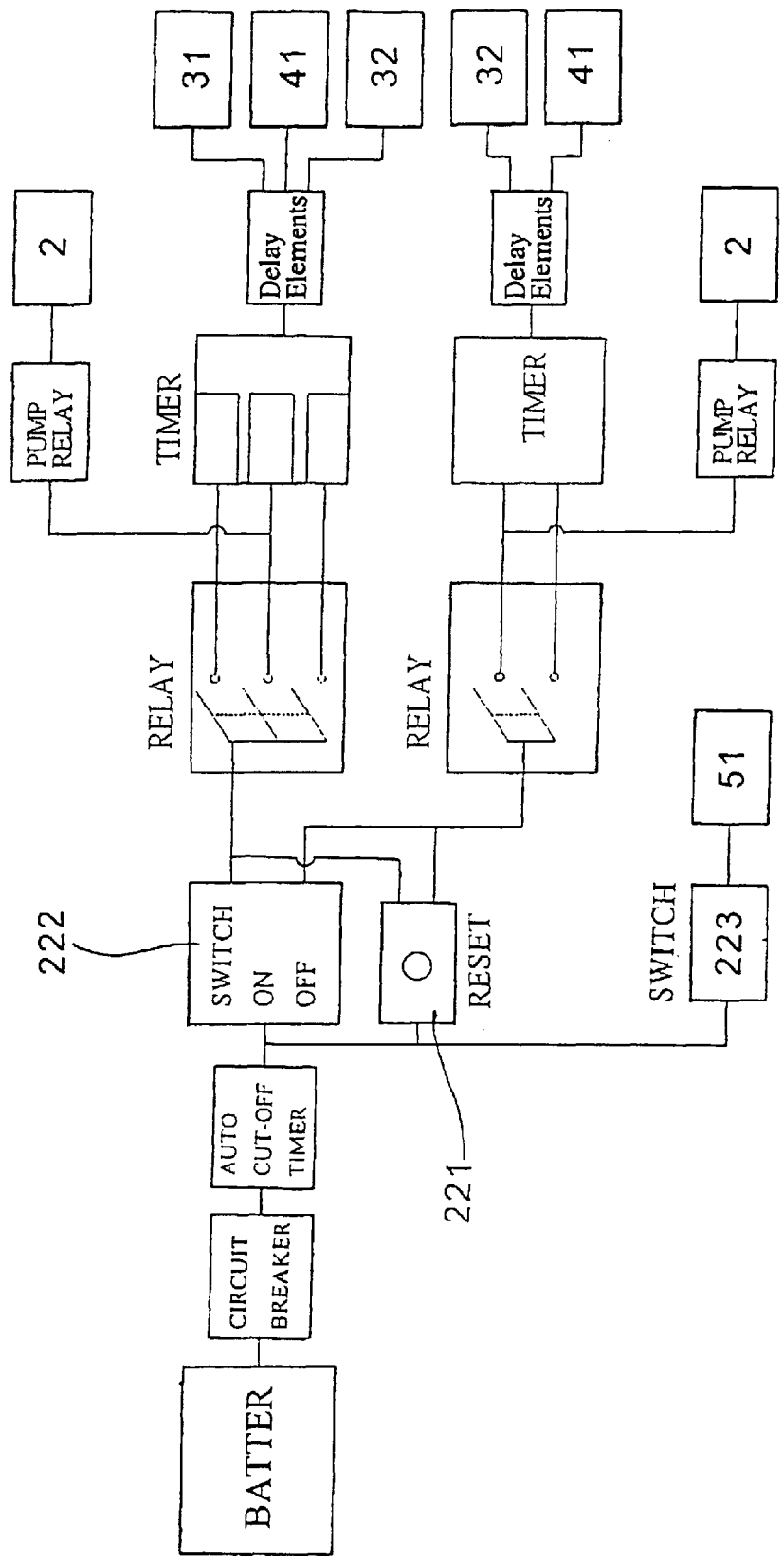

If the hydraulic system of the present invention is not linked to the power steering system of the motor vehicle, the pressure switch 61 is eliminated (see FIG. 7B).

The pressure-setup pipe unit 3 is connected between the pump 2 and the hydraulic cylinders 11, comprising an upper oil chamber connecting pipe 311 connected between the upper oil chambers of the hydraulic cylinders 11, a lower oil chamber connecting pipe 312 connected between the lower oil chambers of the hydraulic cylinders 11, a direction control valve 31 adapted to control the connection of the upper oil chamber connecting pipe 311 and the lower oil chamber connecting pipe 312 to the pump 2 and the oil tank 21, a branch pipe 313 extended from the lower oil chamber connecting pipe 312 to the oil tank 21, a decompression valve 32 installed in the branch pipe 313, and an one-way valve 33 provided between the upper oil chamber connecting pipe 311 and the oil tank 21.

The pressure-relief pipe unit 4 comprises an accumulator 42, a pipe 411 connected between the lower oil chamber connecting pipe 312 and the accumulator 42, a relief valve 41 installed in the pipe 411, and a hydraulic oil pressure sensor 43.

By means of the aforesaid multi-loop arrangement, the present invention effectively releases pressure, preventing the phenomena of dead cylinder (locking of hydraulic cylinders) after a bump.

Figure 2:
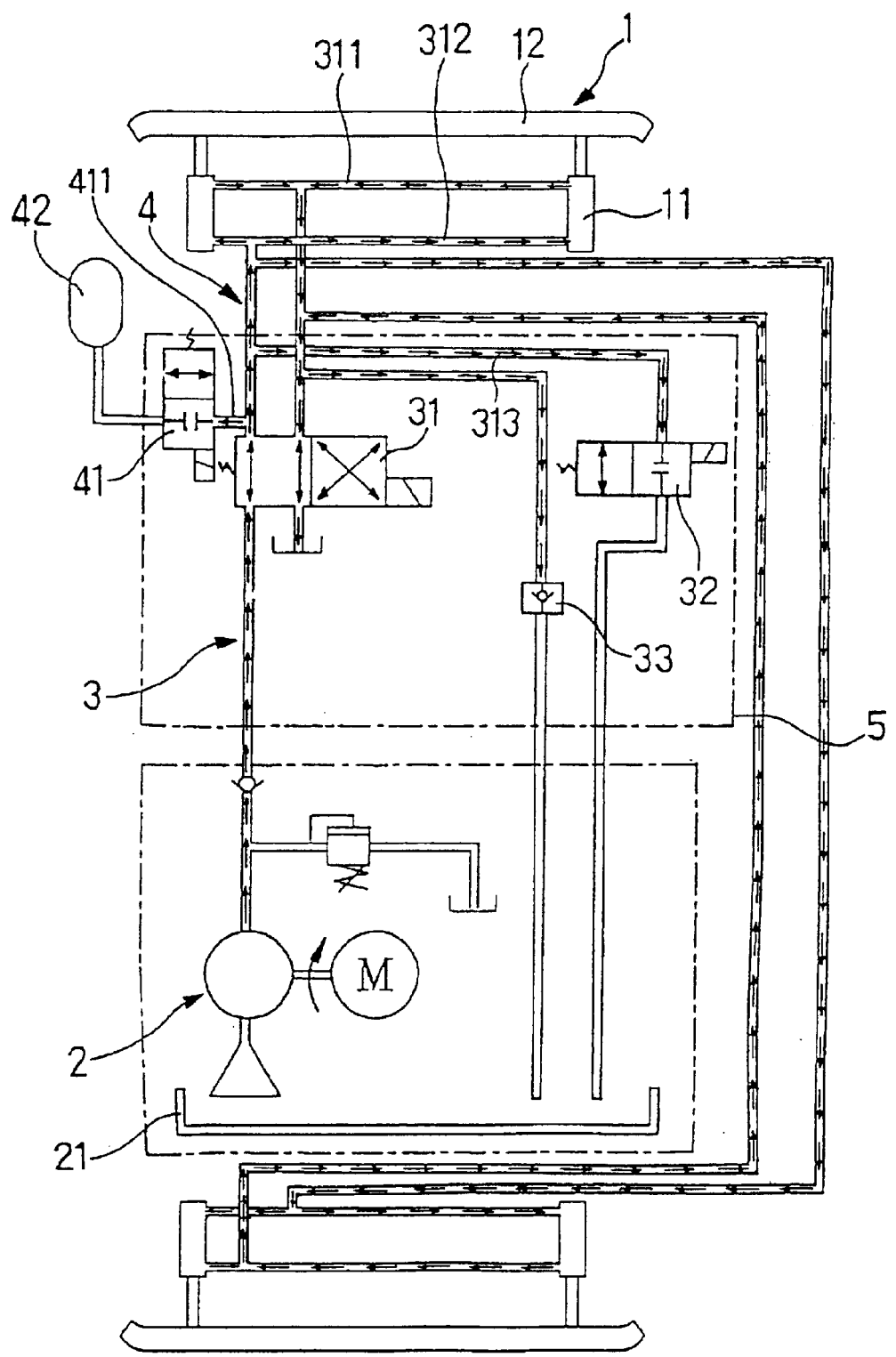
FIG. 2 illustrates the extending action of the bumper system according to the present invention.
Figure 3:
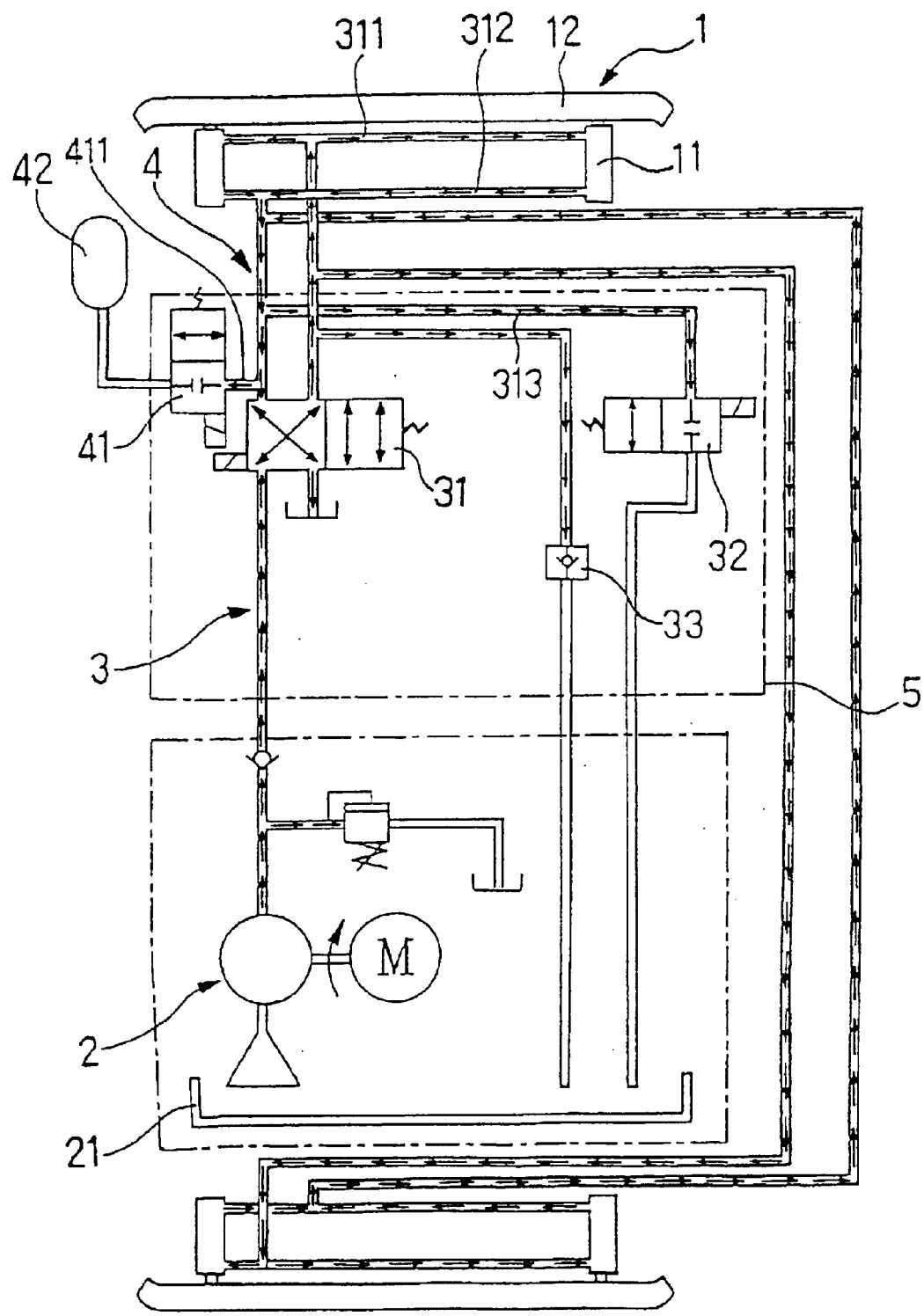
FIG. 3 illustrates the retracting action of the bumper system according to the present invention.

Referring to FIGS. 2 and 3, the start of the present invention is controlled by the on/off switch 222. When started, the decompression valve 32 and the relief valve 41 are closed, the direction control valve 31 is turned to the crossed position, the pump 2 pumps hydraulic oil into the lower oil connecting pipe 312 to set up pressure in the hydraulic cylinders 11, causing the hydraulic cylinders 11 to extend the bumper 12. After the bumper 12 has been extended out, the pump 2 is stopped, the decompression valve 32 and the relief valve 41 are opened to release pressure, keeping the piping in the zero-pressure standby status. When retracted, the decompression valve 32 and the relief valve 41 are closed again, the pump 2 is started to set up pressure, and the direction control valve 31 is turned from the crossed position to the parallel position, enabling the hydraulic cylinders 11 to be synchronously retracted. Thus, when starting the motor vehicle, the bumper unit 1 immediately enters the standby status to protect the motor vehicle against a bump, preventing the occurrence of a disaster.

Figure 4:
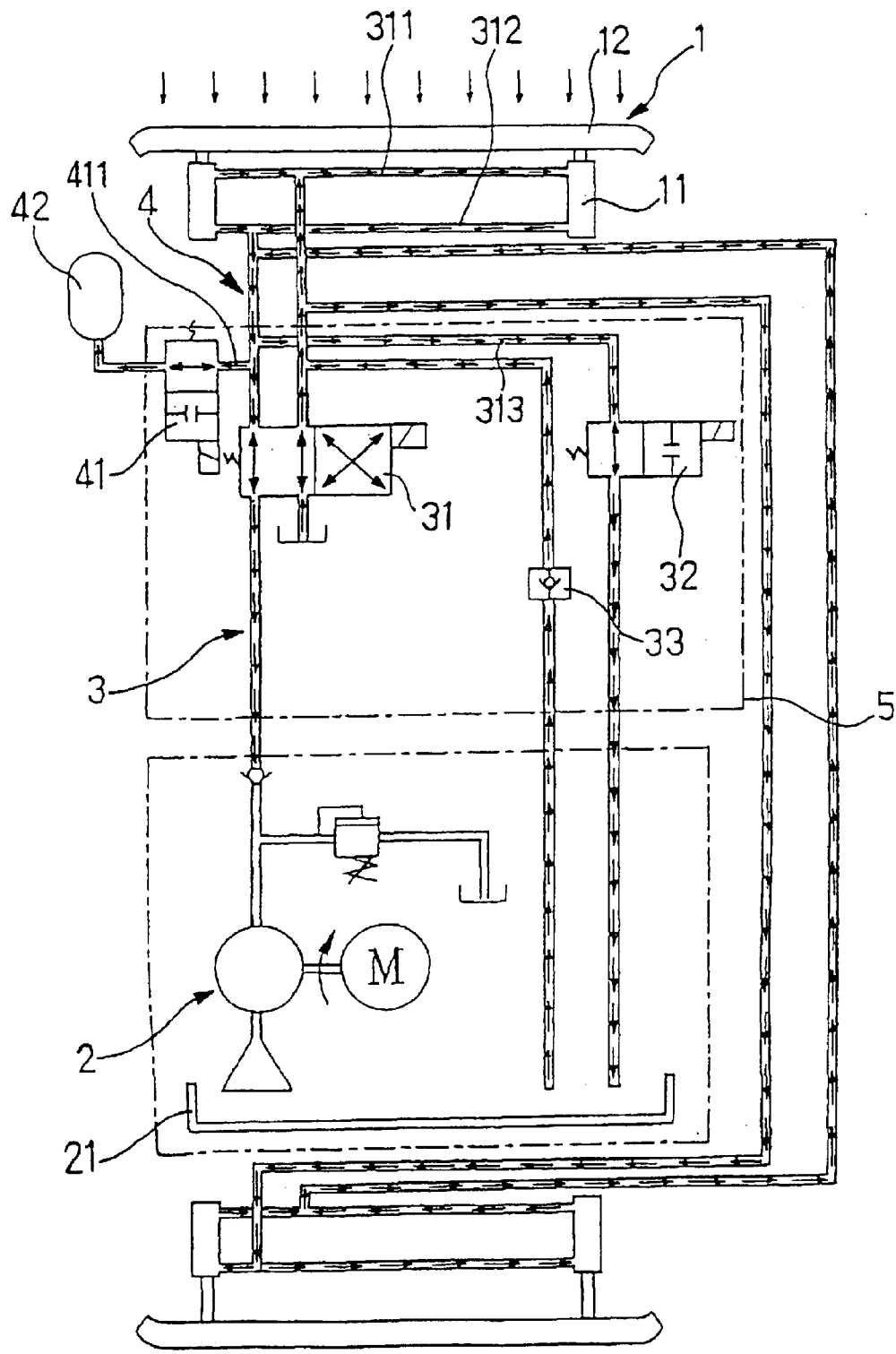
FIG. 4 illustrates the action of the bumper system upon a bumper according to the present invention.
Figure 5A:
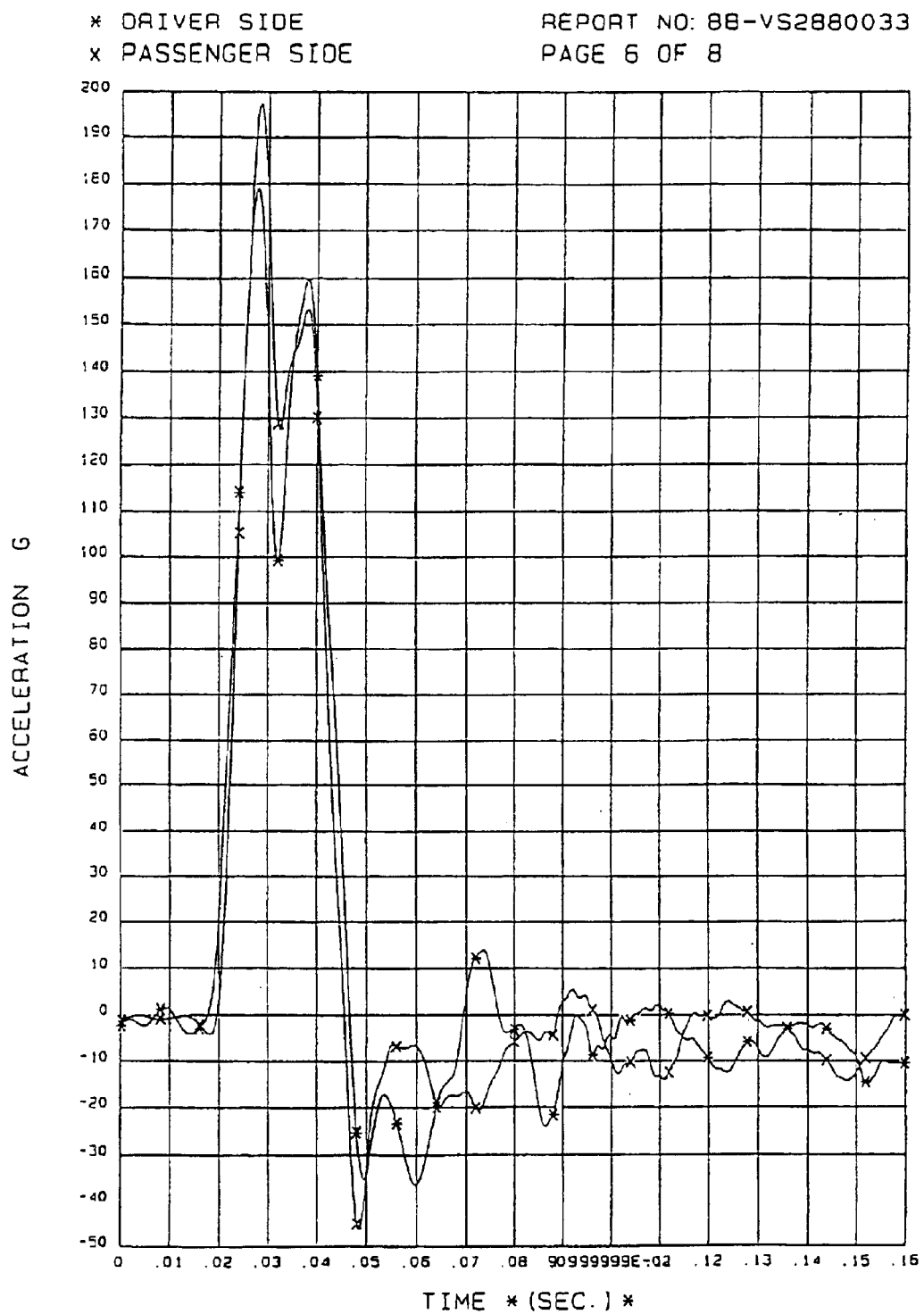
FIGS. 5A–5G are waveform charts obtained from impact tests of the present invention.
Figure 5B:
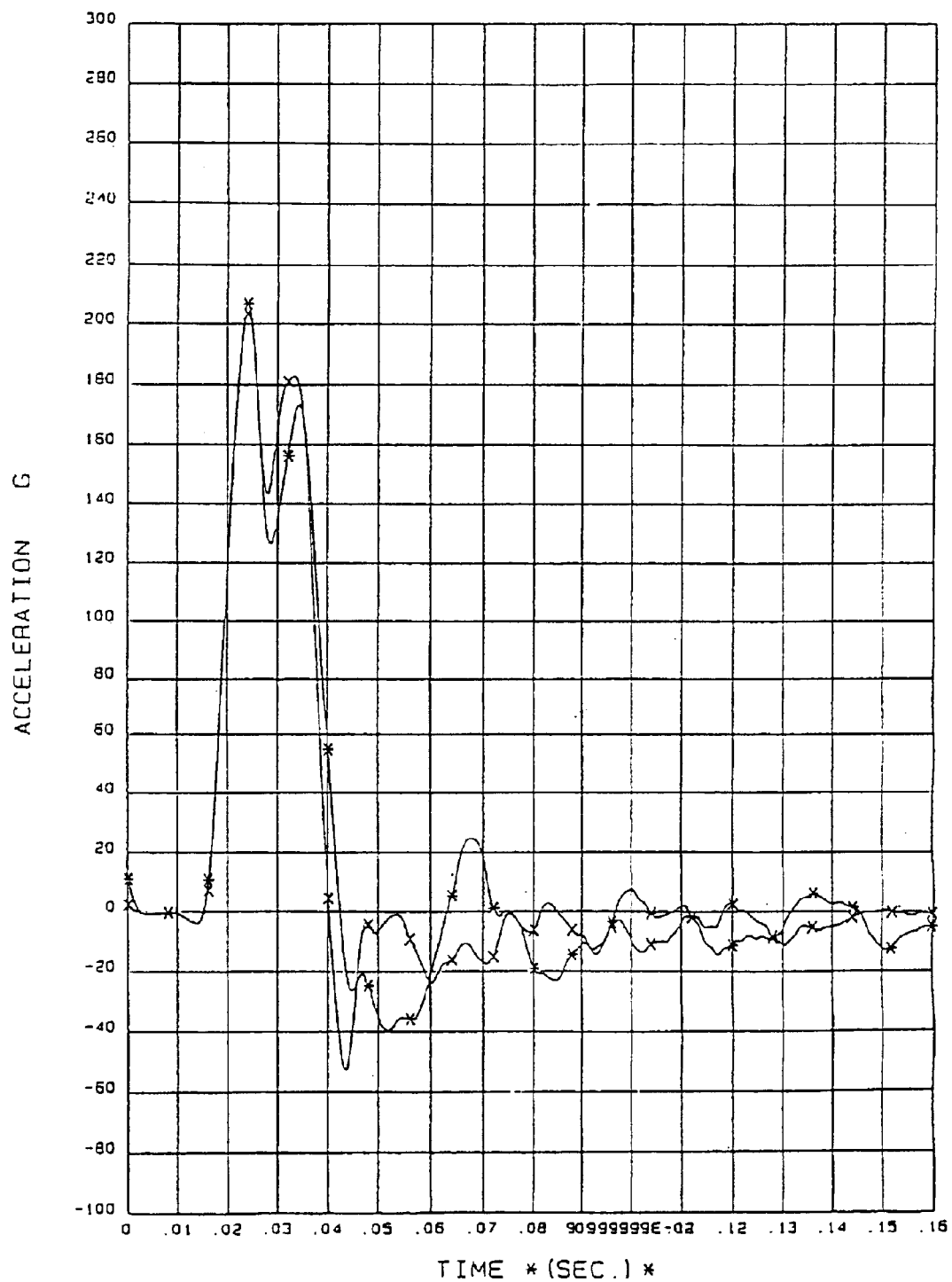
Figure 5C:
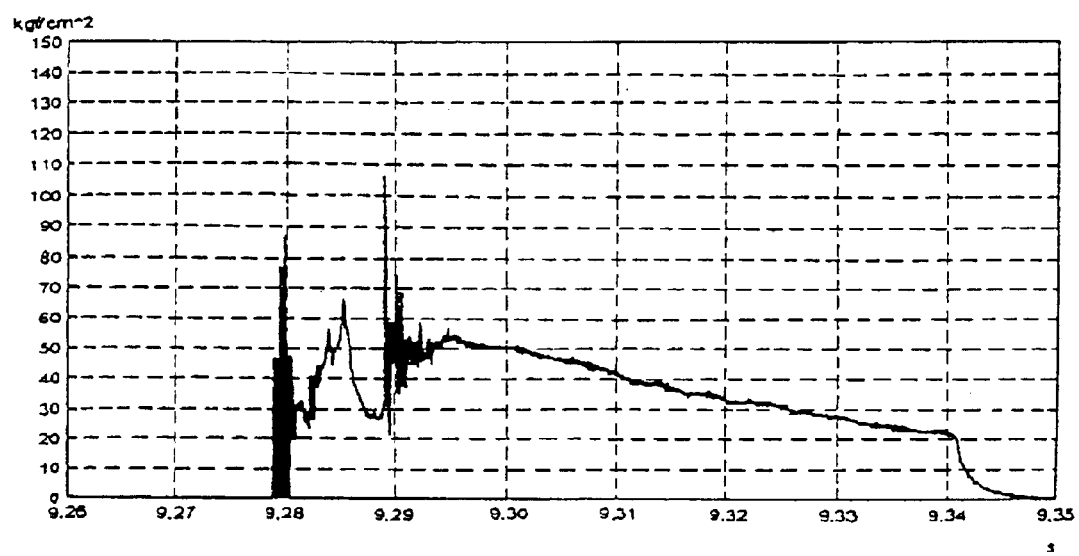
Figure 5D:
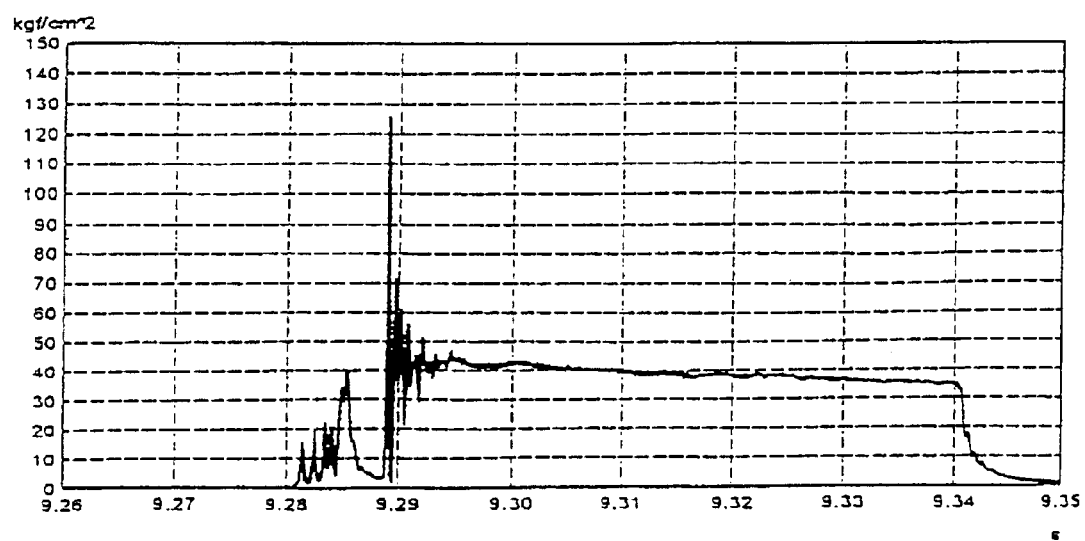
Figure 5E:
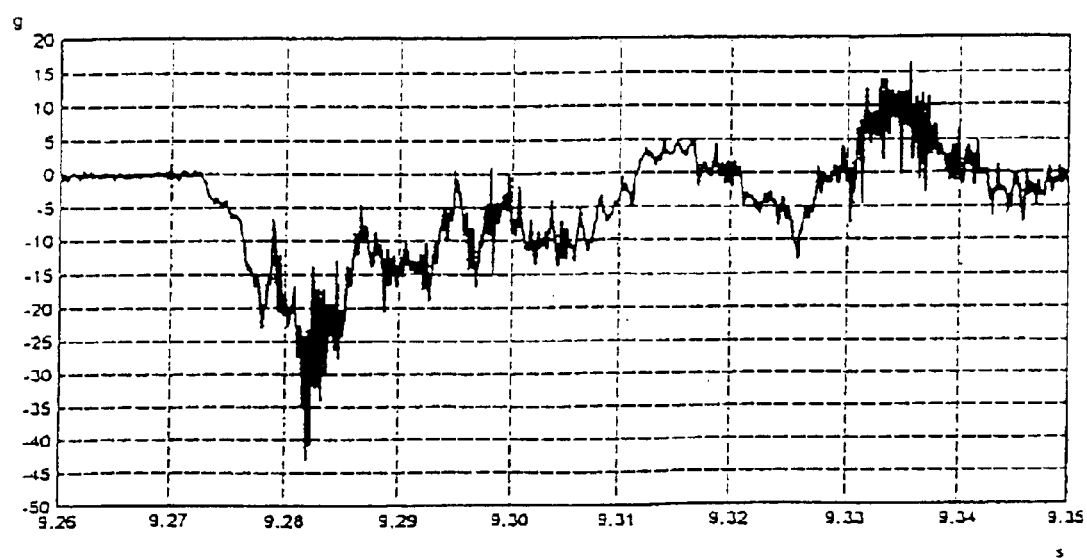
Figure 5F:
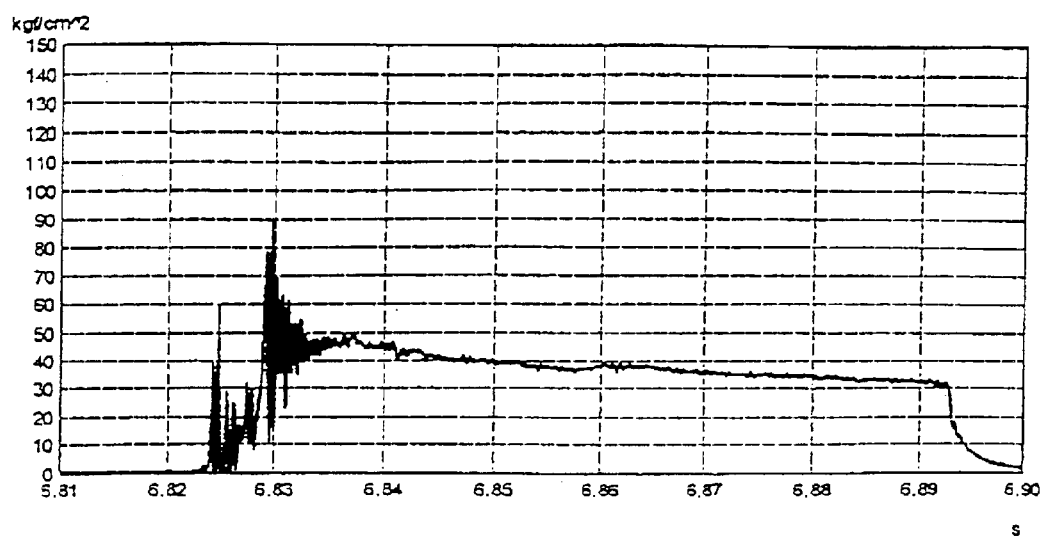
Figure 5G:
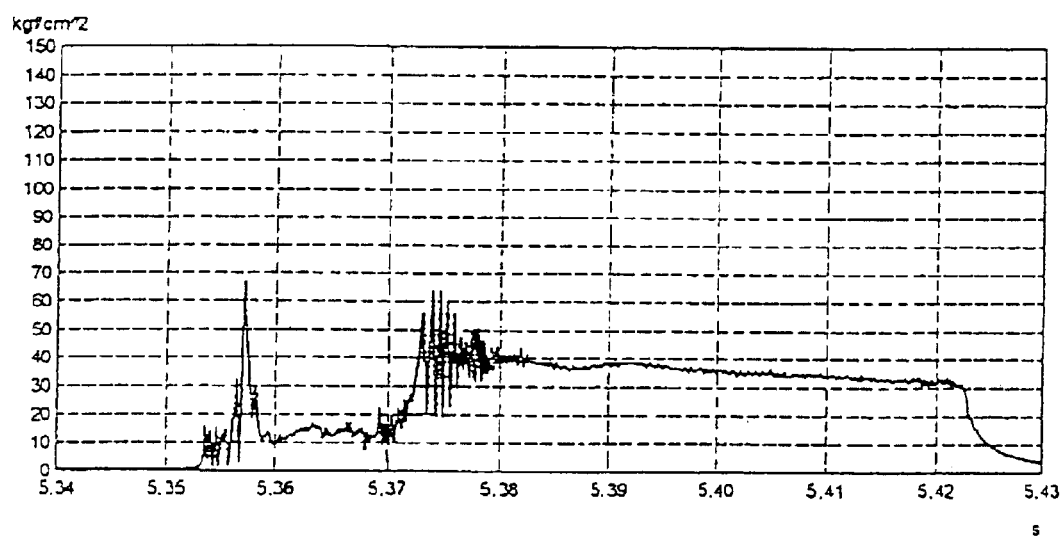

Referring to FIG. 4, the arrangement of the internal loop enables impact pressure to be released in three directions and effectively absorbs shock upon receiving a bump. The first direction is from the lower oil chambers of the hydraulic cylinders 11 through the pipe 411 and the relief valve 41 to the accumulator 42. The second direction is from the direction control valve 31 to the oil tank 31. The third direction is from the branch pipe 313 through the decompression valve 32 to the oil tank 21. The oil tank supplies hydraulic oil through the one-way valve 33 and the upper oil chamber connecting pipe 311 to the upper oil chambers of the hydraulic cylinders 11, preventing the occurrence of a vacuum in the upper oil chambers of the hydraulic cylinders 11 after receiving a bump. Because the invention eliminates the occurrence of a vacuum in the upper oil chambers of the hydraulic cylinders 11 after impact, the phenomena of dead cylinder will not occur. FIGS. 5A-5G show a shock wave absorbing test result of the present invention made by the Vehicle Research and Test Center. As illustrated, the sharp single wave is changed to a smooth double-wave and horizontal wave. Therefore, the invention effectively absorbs shocks, preventing the motor vehicle from deformation upon receiving a bump. In order to protect the vehicle against a secondary bump, the driver or person in the motor vehicle can press the reset switch 221 to reset the bumper unit 1, causing the bumper 12 to be extended out again.

Figure 6:
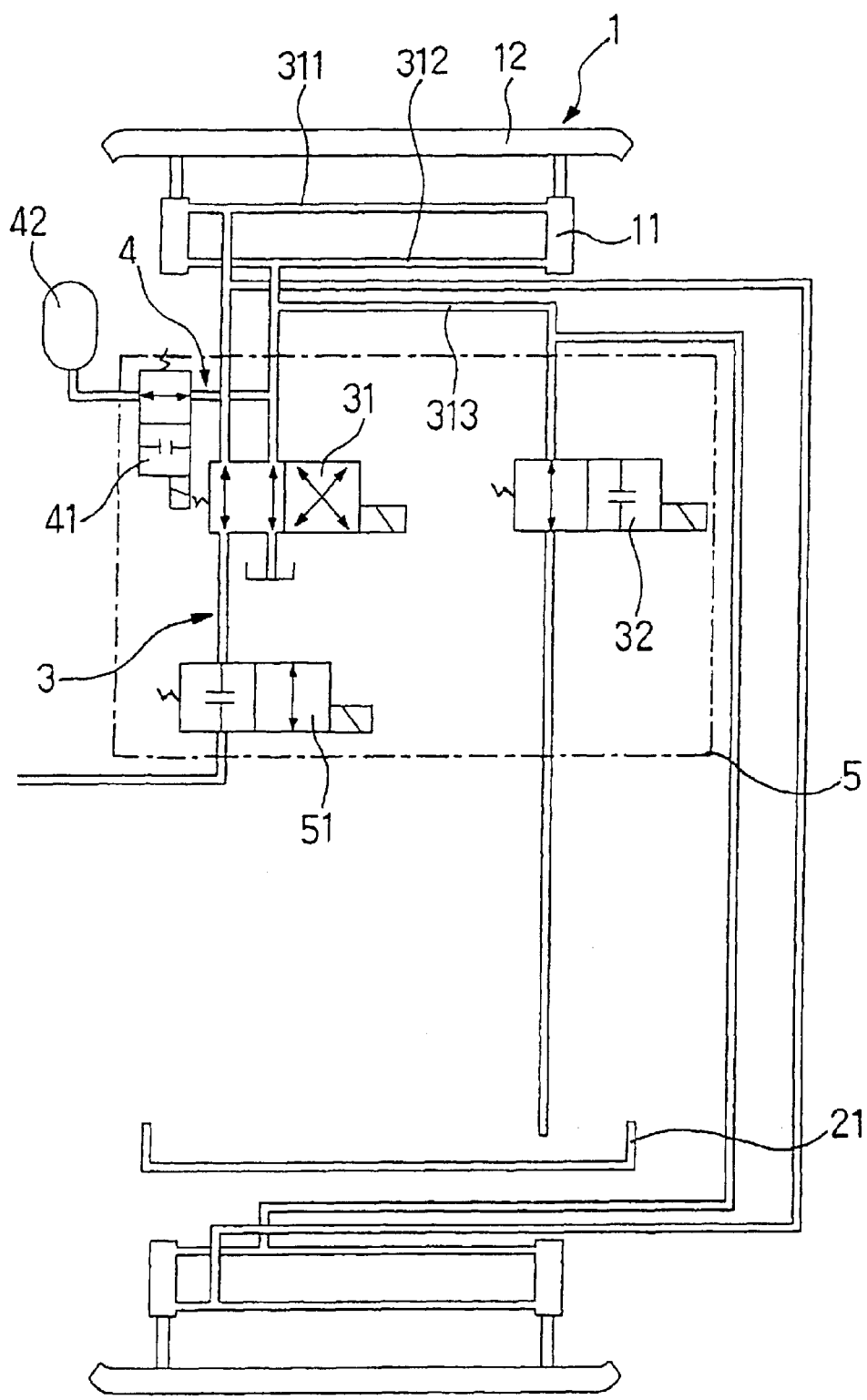
FIG. 6 is plain view showing the arrangement of the motor vehicle bumper system wherein the oil pressure of the pressure-setup pipe unit is obtained from the power steering system of the motor vehicle through a cut-off valve.

Referring to FIG. 6, the direction control valve 31, the decompression valve 32 and the relief valve 41 are mounted on an oil distribution panel 5. The oil pressure of the pressure-setup pipe unit 3 can be obtained from the power steering system of the motor vehicle through a cut-off valve 51. The cut-off valve 51 is a normal-close valve. When electrically connected upon operation of the bumper unit 1, pressured oil enters the direction control valve 31. In this situation, the pump 2 can be eliminated if desired. If the pump 2 is eliminated, the cut-off valve 51 and the oil pressure is obtained from the power steering system of the motor vehicle, the on/off status of the cut-off valve 51 must be reserved to the decompression valve 32 and the relief valve 41.

Referring to FIG. 7, the delay elements in the control circuit controls the position of the direction control valve 31, the decompression valve 32 and the relief valve in the extended upper dead point and the retracted lower dead point, preventing displacement of the hydraulic cylinders 11.

The invention provides an auto-cut off timer control. When the operation of the pump surpasses a predetermined length of time, the control circuit automatically cuts off power supply from the pump, preventing overheating of the pump.

The extending, bumping, after-bump, and retracting control status of the present invention are outlined below.

a. Starting and extending: When the on/off switch 222 is switched on, the decompression valve 32 and the relief valve 41 are switched off, as shown in FIG. 8A, and the valve rod 321 is lowered to compress the spring 323, causing the valve block 322 to close the oil inlet 325. At this time, the pump 2 is started to increase pressure, and the direction control valve is turned to the parallel position. When the hydraulic cylinders 11 are fully extended out, power supply is cut off from the pump, the decompression valve 32 and the relief valve 41 are switched on again, returning to the standby status and, as shown in FIG. 8B, the valve rod 321 is pushed back by the spring 323 to half-open the oil inlet 325 and the oil outlet 326.

b. Bumping: The direction control valve 31 is kept in the parallel position, the decompression valve 32 and the relief valve 41 are opened. In addition to on/off functions, the decompression valve 32 and the relief valve 41 automatically change the caliber of the oil passage subject to the amount of impact pressure, so as to automatically regulate the flow rate and the pressure of hydraulic oil within the safety range (as shown in FIG. 8C, the valve rod 321 is moved upwards to compress the spring 324, and to fully open the oil outlet 326 to increase the flow rate). Therefore, the impact force after a bump is relieved and absorbed by means of the aforesaid method.

c. After bump: In order to enable the motor vehicle to protect against a secondary bump, the reset switch 221 is depressed to switch the decompression valve 32 and the relief valve 41 to the close position, the direction control valve 31 is switched from the crossed position to the parallel position, and to electrically connect the pump 2, enabling the hydraulic cylinders 11 to extend out the bumper 12. After the bumper 12 has been extended out, the pump 2 is turned off, and the decompression valve 41 and the relief valve 32 are switched back to the open position.

d. Retracting: When the on/off switch 222 is switched off, the decompression valve 32 and the relief valve 41 are tuned to the close position, the pump 2 is operated to set up pressure, the direction control valve 31 is turned from the parallel position to the crossed position, and the hydraulic cylinders 11 are forced to retract the bumper 12. When retracted, power supply is cut off from the pump 2, and the decompression valve 32 and the relief valve 41 are switched to the open position to reset the system from zero.

It is to be understood that the drawings are designed for purposes of illustration only, and are not intended for use as a definition of the limits and scope of the invention disclosed.

I claim:

1. A motor vehicle bumper system installed in a motor vehicle and using flow rate of oil circulating through an oil tank of the motor vehicle to control pressure and an accumulator to absorb energy upon receiving a bump, comprising:

a. a bumper unit, said bumper unit comprising a bumper, and parallel hydraulic cylinders controlled to move said bumper between an extended position and a retracted position;

b. a pressure-setup pipe unit connected between said hydraulic cylinders, and an oil tank of the motor vehicle, said pressure-set up pipe unit comprising an upper oil chamber connecting pipe connected between an upper oil chamber of said hydraulic cylinders for guiding the oil into said hydraulic cylinders to retract said bumper, a lower oil chamber connecting pipe connected between a lower oil chamber of said hydraulic cylinders for guiding the oil into said hydraulic cylinders to extend out said bumper, a direction control valve adapted to control the connection of said upper oil chamber connecting pipe and said lower oil chamber connecting pipe to a pump and the oil tank of the motor vehicle, a branch pipe extended from said lower oil chamber connecting pipe to the oil tank of the motor vehicle, a decompression valve installed in said branch pipe; and c. a pressure-relief pipe unit, said pressure-relief pipe unit comprising the accumulator, a hydraulic oil pressure sensor, a pipe having one end connected to said lower oil chamber connecting pipe and an opposite end connected to said hydraulic oil pressure sensor through said accumulator, and a relief valve installed in the pipe between said lower oil chamber connecting pipe and said accumulator; and d. wherein when a control switch means is switched on, said decompression valve and said relief valve are closed, a direction control valve is in action, and said pump is started to pump the oil to said hydraulic cylinders to extend out said bumper, and then said decompression valve and said relief valve are opened after said bumper has been extended out; when said control switch means is switched off, said decompression valve and said relief valve are closed, said direction control valve is reversed, enabling said hydraulic cylinders to retract said bumper.

2. The motor vehicle bumper system of claim 1, wherein said pressure-setup pipe is connected to said pump, said pump being connected between said hydraulic cylinders and said oil tank and controlled by said control switch means thereby activating said pump to provide pressure for extension and retraction of said hydraulic cylinders through a cut-off valve.

3. The motor vehicle bumper system of claim 2, wherein said control switch means comprises a reset switch adapted to reset the system after receiving a bump.

4. The motor vehicle bumper system of claim 2, wherein said relief valve and said decompression valve respectively change respective oil passage extending through a respective valve block thereof to regulate the flow rate of the oil passing through upon receiving the bump subject to the energy of impact of the bump.

5. The motor vehicle bumper system of claim 2, wherein said direction control valve, said decompression valve and said relief valve are mounted on an oil distribution panel.

6. The motor vehicle bumper system of claim 2, wherein said pressure relief pipe unit further comprises an one-way valve connected between said upper oil chamber connecting pipe and said oil tank for enabling the oil to be delivered in one direction from the oil tank of the motor vehicle to said upper oil chamber connecting pipe to the upper oil chambers of said hydraulic cylinders, so as to prevent locking of said hydraulic cylinder upon receiving the bump.

7. The motor vehicle bumper system of claim 2, further comprising a timer circuit adapted to automatically cut off power supply from said pump for a predetermined length of time after receiving the bump.

* * * * *